July 2, 1968 J. H. FREEMAN ET AL 3,391,246

MULTICONDUCTOR FLAT CABLES

Filed March 16, 1964 2 Sheets-Sheet 1

INVENTORS
James H. Freeman, Edward J. Traynor
and Charles R. Ruffing.
BY *Alex Mich, Jr.*
ATTORNEY July 2, 1968 J. H. FREEMAN ET AL 3,391,246

MULTICONDUCTOR FLAT CABLES

Filed March 16, 1964 2 Sheets-Sheet 2

3,391,246
MULTICONDUCTOR FLAT CABLES
James H. Freeman, Murrysville, Edward J. Traynor, Monroeville, and Charles R. Ruffing, Pittsburgh, Pa., assignors to Westinghouse Electric Corporation, Pittsburgh, Pa., a corporation of Pennsylvania
Filed Mar. 16, 1964, Ser. No. 352,163
6 Claims. (Cl. 174—117)

This invention relates to flat, discrete multiconductor, flexible electrical wiring members and to methods for manufacturing them. More particularly, this invention relates to spaced multi-conductor flat flexible cable and methods of producing such flat flexible cables.

Conventional round wire and cables employing round wire are classic means for interconnecting electrical components. Complex electronic systems, however, provide only limited spaces for component interconnection and the classic wiring means are frequently unsatisfactory for the required high-density wiring. Moreover, the termination of such cables requires each round wire to be individually joined to terminals, through pin and socket or solder joint or some other type of individual junction. The wiring of complex systems by these means is complicated by problems of weight, space, joining procedures and difficulty in identifying leads or tracing circuit faults.

Complex circuits and electronic systems have become important in the fields of aircraft controls, missile guidance, telemetry, computer wiring, business machines,, radar, radio and television and other signaling equipment. Thin, flat multiple conductor wiring cable represents an effort to simplify the problems encountered in such complex systems. Flat cables have been fabricated by sandwiching spaced flat metallic conductors between an upper and a lower surface of preformed insulating film. Usually, an adhesive is also employed between the film layers to bond the conductors and insulation together. The composite is then passed between heated rolls to produce a bonded thin laminate structure.

Although certain problems in maintaining proper conductor spacing are encountered, flat cable may be made by passing preformed thermoplastic films, having low softening temperatures, between heated pressure rolls. The spaced flat metallic conductors are, of course, disposed between the preformed film and sealed therebetween.

Certain disadvantages are inherent in both the methods and products which have heretofore employed preformed film. Since the composite structure must be passed between heated pressure rolls, it is difficult to maintain accurate conductor spacing. The film must be sufficiently heated to actually soften it so that the conductors can be bonded and sealed therebetween. At this stage, there is a pronounced tendency for the conductors, even though they are small and thin, to slip out of proper registry. It is, of course, advantageous to employ films which have low softening or distortion points in order to simplify the bonding process. However, films with low softening points will be accordingly limited in service temperature capabilities and the low distortion points tend to interfere with the desired precision spacing and maintenance of registry.

Serious problems are frequently encountered in removing the insulating film to expose the conductors so that contact may be made therewith. Abrasion techniques for removing insulation to expose the conductors can easily damage the conductors since the conductors are small and fragile. Melt removal techniques which may be employed to remove thermoplastic films frequently fail to yield clean conductor contact surfaces. Mechanical handling of exposed leads after removal of insulation may result in damage to the fragile conductors. Other materials, with properties suitable for prolonged exposure to rigorous environments are not generally suitable for the methods heretofore employed for producing flat multi-conductor cable or for the methods heretofore employed for the removal of the insulating film to expose conductor contact surfaces. If an adhesive is employed between the films, its properties will limit the processing conditions and the properties of the ultimate product. It should be noted that the techniques and materials for forming cable connectors integral with the flat cable have also been limited by the insulating films and adhesives heretofore employed.

Accordingly, it is the general object of this invention to provide a new and improved flexible flat multiconductor cable that may be exposed to rigorous environments for prolonged periods of time.

Another object of this invention is to provide new and improved methods of fabricating flexible flat multiconductor cable and methods for simultaneously producing such cable and unsupported resinous films.

Yet another object of this invention is to provide flat conductor cable having insulation which may be easily and reliably removed to expose conductor contact surfaces without damaging the fragile conductors.

A further object of this invention is to provide flat multi-conductor cable which is especially suitable for convenient conductor termination and the formation of integral end connectors.

Briefly, the present invention accomplishes the above cited objects by providing members which have a plurality of spaced flat conductors and infusible solid resinous films of aromatic polyimides and preferably aromatic polyamide-imides to support and insulate the thin flat metallic conductors. This invention also provides novel methods for producing flat conductor members. A parallel series of flat metal conductors and a backing strip of suitable material may be simultaneously and continuously fed into and through an impregnating solution which, upon proper curing, will provide a film of the described aromatic polymer. The backing material may remain as part of the insulation, may be designed to include a shield for the conductors or may be stripped from the conductors and integrated into a generated film of the described resinous solid.

Use of the aromatic polyimide or aromatic polyamide-imide insulating film on at least one side of the flat cable permits the use of a new and improved method of chemically removing that insulating film to expose the surface of the fragile conductors. The conductors may be easily and conveniently exposed either at the ends or at any desired intermediate position along the length of the cable in accordance with methods described by C. R. Ruffing in application Ser. No. 352,155, filed Mar. 16, 1964, assigned to the assignee of this invention. Moreover the flat conductor cable of this invention is particularly suitable for the novel integral molded connectors and methods of termination described by Travis in application Ser. No. 352,156, filed Mar. 16, 1964, assigned to the assignee of this invention. To be able to employ the heretofore mentioned method of chemical removal it is essential for at least one surface film of the insulation on the flat cable to be a solid resinous aromatic polyimide or aromatic polyamide-imide and preferably for that film to be in contact with the surfaces of conductors which are to be exposed.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 2:
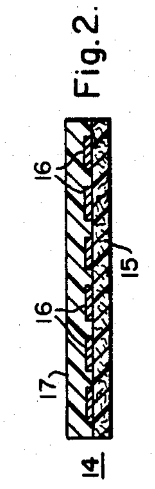
FIG. 2 is a cross sectional view of another embodiment of the flat conductor cable in accordance with this invention.

It has now been discovered that new and improved flat, flexible multi-conductor cable or electrical members may be comprised of a series of individual or discrete spaced thin substantially coplanar flat metallic conductors supported and insulated by at least one, but preferably two, films of solidified aromatic polyimide or aromatic polyamide-imide resin. Such cables may be conveniently produced in a continuous manner. The fragile conductor surfaces may be easily and reliably exposed by simple chemical removal techniques. Integral connectors may be molded from a variety of materials around the cable without degrading the insulation. The cables have excellent thermal stability so they may be employed at temperatures as high as 275° C. for periods in excess of 1,000 hours, yet remain flexible at temperatures as low as −100° C. The cables are tough, transparent, resistant to ionizing radiation, flexible, capable of being folded and twisted without separating or delaminating, possess a high electric strength, have good electrical dissipation factors and dielectric constants which remain stable over a wide temperature range. The cables, in their preferred form, are resistant to all common solvents and oils and most chemical agents, except strong alkali.

Suitable resinous films for insulating and supporting the thin coplanar metallic conductors, in accordance with this invention, are known as aromatic polyimides or aromatic polyamide-imides and have the recurring unit:

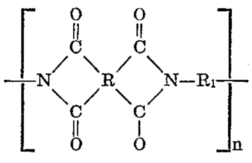

wherein $n$ is at least 15, R is at least one tetravalent organic radical selected from the group consisting of:

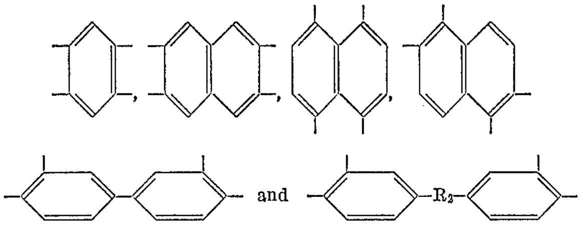

$R_2$ being selected from the group consisting of divalent aliphatic hydrocarbon radicals having from 1 to 4 carbon atoms and carbonyl, oxygen, sulfur and sulfonyl radicals and in which $R_1$ is at least one divalent radical selected from the group consisting of:

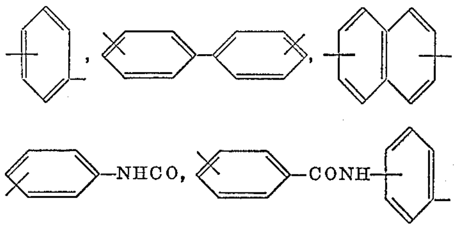

and

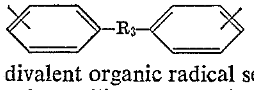

in which $R_3$ is a divalent organic radical selected from the group consisting of $R_2$, silicon and amido radicals. Polymers containing two or more of the R and/or $R_1$ radicals, especially multiple series of $R_1$ containing amido radicals, are particularly valuable in some instances. The resinous materials described hereinabove are capable of being formed into films and supporting and insulating thin flat conductors as flexible composites. Moreover, the precursors, described in detail hereinafter, may be deposited from liquid solutions.

The aromatic polyimide resins represented by the foregoing formula are described in British Patent 903,271 and reference may be made thereto for details on the methods of preparing the resins. The aromatic amide modified polyimide resins, known herein as aromatic polyamide-imide resins, represented by the foregoing formula are described and claimed in U.S. Patent 3,179,635, assigned to the assignee of this invention, and reference may be made thereto for details on the methods of preparing those resins. Reference may also be made to an article by Frost and Bower, entitled, "Aromatic Polyimides," in J. Polymer Science, Part A, vol. 1, pp. 3135–3150 (1963). For convenience, the resins will hereinafter be referred to as aromatic polyimides or aromatic polyamide-imides. It will be apparent to those skilled in the art that the polyamide-imide resins are those in which $R_3$ is an amido radical or more generally a finite series of aromatic groups linked by amido radicals in addition to the imide linkages.

Figure 1:
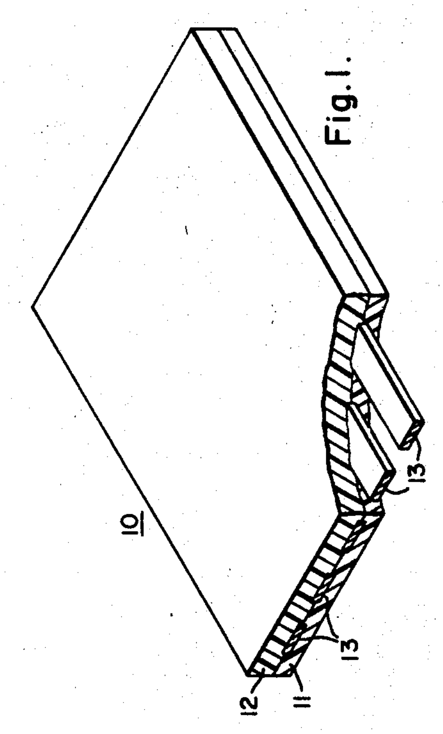
FIGURE 1 is a sectioned, partially exposed perspective illustration of a flexible, flat multi-conductor cable in accordance with this invention.

Referring now to FIG. 1, a flat multi-conductor cable 10 is comprised of an aromatic polyimide film 11, 12 which surrounds, supports and insulates a plurality of thin, flat spaced copper foil conductors 13 to produce a unitary structure therewith. The conductors 13 are uniformly spaced along the length of the cable to form individual conductive paths, are parallel and are located in substantially the same plane. The aromatic polyimide films are derived from aromatic polyamic acid precursors in a manner known in the art and described, for example, in the British Patents 898,651 and 903,271. Methods of preparing flat cable employing polyamic acid precursors will be discussed in detail hereinbelow.

In FIG. 2, a fibrous material 15 is coated and impregnated with an aromatic polyamide-imide to provide support for the conductors 16. A sufficient amount of the polyamide-imide may be employed to provide a cover coat 17, thereby forming the cable 14. If desired, another resinous material may be employed to impregnate the fibrous material 15 and the polyamide-imide resin may form the cover layer 17. Suitable fibrous materials are, for example, glass fabrics, carbon or silica cloth and fibrous forms of aromatic polyimide resins for high temperature applications and paper, cotton, polyamide or polyester fabrics or other synthetic fibers for lower temperature applications. All coherent forms, for example matted and woven, of fibers may be employed.

Figure 3:
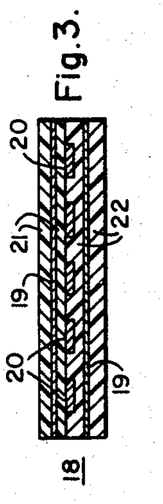
FIG. 3 is a cross sectional view of another embodiment of a flat conductor cable in accordance with this invention.

In FIG. 3, we have illustrated a flat cable 18 which incorporates metallic strips 19 comprised either of foil or metallic strands woven as gauze to shield the conductors 20. Shielding may be used on either one or both sides of the flat cable. The insulating films 21, 22 may be any of the resinous films described hereinbefore or hereinafter. In certain applications, composite films are employed in order to incorporate the beneficial properties of several materials. However, for the advantageous methods of exposing conductor surfaces to be employed, at least one film must be an aromatic polyimide or aromatic polyamide-imide.

Figure 4:
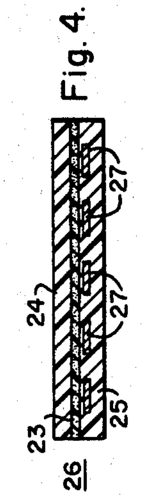
FIG. 4 is a cross sectional view of another embodiment of a flat conductor cable in accordance with this invention.

FIG. 4 illustrates an embodiment which employs a separate adhesive layer 23 between film layers 24, 25 to form the cable 26 with a plurality of conductors 27. The layers 24, 25 are preformed films, at least one, but preferably both, being a film of aromatic polyimide or aromatic polyamide-imide. At least one of the films of aromatic polyimide or polyamide-imide should be in contact with the conductor surface so that the surface is exposed when the film is removed. One film may be of another resinous material, as for example solid resinous films of polyester, polycarbonate, polyvinylidene chloride, polyvinylidene fluoride, polyethylene, polytetrafluoroethylene or polychlorotrifluoroethylene resins. The adhesive layer 23 may be a polyester, an epoxy or a phenolic-nitrile adhesive or a layer of certain polyamide-imide resins.

Figure 5:
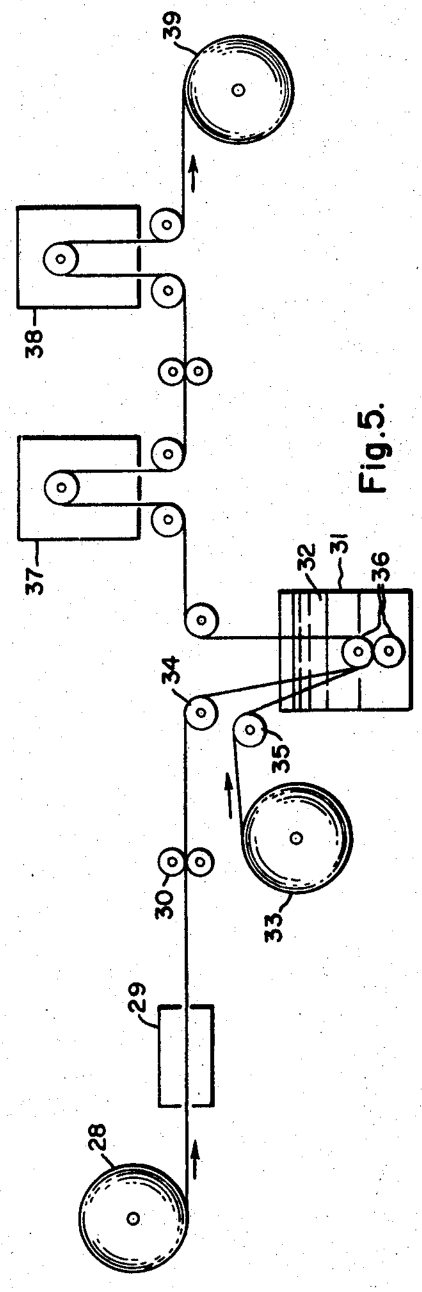
FIG. 5 is a schematic elevation illustrating the preparation of flat, multi-conductor cable in accordance with this invention.

A suitable backing material is employed in one method of continuously manufacturing flat, multi-conductor cable in accordance with this invention. Referring now to FIG. 5, copper foil, 2 mils thick is continuously paid-off of the reel 28 to a slitter 29, where the copper foil is slit into any fixed number of conductors. The series of strip conductors are held parallel by the grooved guide rolls 30, located immediately above the resin solution tank 31. The parallel series of metal strip conductors is passed into the tank 31 so that all conductors are wetted by the resin solution 32. A solution of an appropriate aromatic polyamic acid. Simultaneously, a glass fabric or other backing strip is paid-off of the reel 33 so that it too is wetted, and impregnated, by the resin solution. The conductor guide 34 and the web guide 35 act to accurately space the conductors from each other and position the conductors relative to the backing strip. The conductors adhere to the web by the surface tension of the wet resin solution film after being forced together by the squeeze-rollers 36 mounted below the resin solution surface. Alternatively, the squeeze-rollers 36 may be located above the resin solution, or additional rollers may be provided as the conductors and web emerge from the solution to allow the resin to flow evenly over the conductors and the reinforcing web as both are pulled out of the resin solution tank. The web, conductor and wet film composite is then moved through a heated vertical drying tower 37, making a sufficient number of passes therein to drive off the solvent and make a tack free composite. The composite is then moved through a heated vertical curing tower 38, making a sufficient number of passes to cure the tack free resinous film to its solid flexible state. The composite is then wound onto the take-up reel 39. It should be understood that where a greater film thickness is necessary or desired, an additional bank of equipment may be added after the curing tower 38 to deposit, dry and cure an additional layer of resinous film. A single tower may be employed to drive off the solvent from the wet film and to cure the film, if desired.

EXAMPLE I

A dimethyl acetamide solution of a precursor polyamic acid formed by the reaction of pyromellitic dianhydride (PMDA) and 3,4′-diaminobenzanilide, containing 16 percent solids, is added to the resin solution tank. Individual slit conductors, spaced 1/16-inch apart, and a glass cloth backing strip 0.004 inch thick are simultaneously passed through the resin solution. After 30 minutes in the drying tower at 100° C. the tack-free composition is heated for 45 minutes in the curing tower at 150° C., followed by 15 minutes at 225° C., in separate heating zones.

EXAMPLE II

This process is identical to that described in Example I except that a glass cloth backing 0.0015 inch thick is employed. The flexibility is significantly enhanced by the thinner cloth.

It should be understood that other backing materials, as for example, polyester paper, polyamide or polyimide paper or film or polytetrafluoroethylene film may be employed in place of the glass cloth. Similarly, other aromatic polyamic acid precursor solutions may be substituted for the precursor solution employed in Examples I and II. However, the polyamide-imide solid resin film produced in Examples I and II is unusually attractive insofar as it may be removed by caustic at a surprisingly faster rate than other polyamide-imide or polyimide films. It should also be understood that the drying and curing of the deposited film is a time-temperature phenomena and, accordingly, other time-temperature combinations may be employed.

Figure 6:
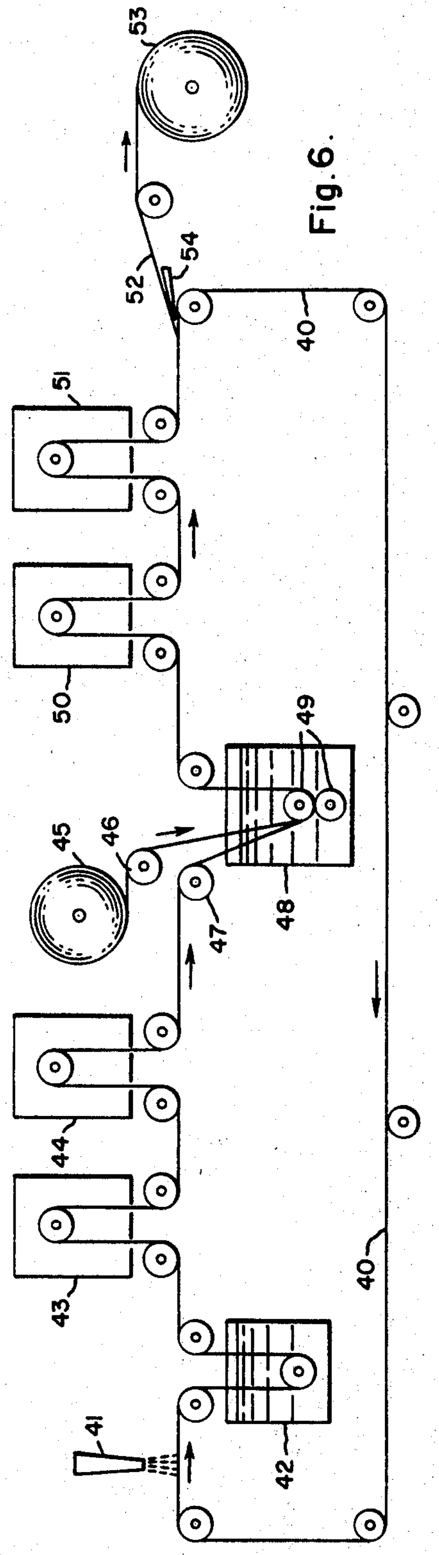
FIG. 6 is a schematic elevation illustrating another method of preparing flat, multi-conductor cable in accordance with this invention.

A continuous carrier or endless belt may be advantageously employed in producing the flat, multi-conductor cable, as illustrated in FIG. 6. A continuous stainless steel belt 40 is prayed with a release agent at the nozzle 41. The belt is passed through tank 42 containing a solution of an appropriate polyamic acid precursor and a wet film is deposited on the belt. The belt is moved through the heated vertical drying tower 43, making a sufficient number of passes to drive off the solvent and make the film tack-free. From the drying tower, the belt is directed to a heated vertical curing tower 44, making a sufficient number of passes to cure the resinous film to its solid flexible state. Slit conductors from the pay-off reel 45 pass over the position guide 46, having a precision grooved mandrel or a series of comb fingers to maintain an accurate spacing between conductors. The position guide also establishes the desired relationship between the strip conductors and the continuous belt. The strip conductors should be located above and within the boundaries of the continuous belt. The web guide 47 accurately positions the continuous belt. The conductors and the belt pass into the resin solution tank 48, containing an aromatic polyamic acid precursor solution, where they are wetted before coming together at the squeeze-rollers 49. The composite of conductors, web and wet film is moved through a second heated vertical drying tower 50, which may be identical to the drying tower 43, then through a vertical curing tower 51, which may be identical to the curing tower 44. The finished flat multi-conductor cable is removed from the continuous stainless steel belt 40 at the stripper 54. The cable 52, in its finished form, is then wound onto the take-up reel 53. The continuous belt 40, since it is in endless form, returns to the release spray nozzle 41 where the described process is repeated.

If necessary, the endless continuous belt 40 may be cleaned at some point (not illustrated) before it returns to the release agent spray nozzle. The resin solution tank 42 may contain an appropriate drum applicator so that a resin coating is deposited on only one side of the continuous belt. If a resin coating is deposited on both sides of the continuous belt, the described apparatus and process may be advantageously modified to simultaneously generate a separate self-supporting resinous film. In that case, an additional release agent spray nozzle would deposit the release agent on the opposite side of the foil and an additional stripper would be required to remove the film from the opposite side of the continuous belt 40. A take-up reel would be provided to accumulate the generated film.

EXAMPLE III

A dimethyl acetamide solution of a polyamic acid precursor prepared from the reaction of pyromellitic dianhydride (PMDA) and 4,4′-diaminophenyl sulfide, containing 14.5 percent solids, is added to the resin solution tanks 42, 48 in the apparatus described hereinabove in FIGURE 6. The release coated endless stainless steel belt is passed through the solution and the deposited wet film is passed through the towers to form a solid coating. Individual slit conductors, 0.002-inch thick, spaced 1/16-inch apart, and the endless stainless steel belt are simultaneously passed through the resin precursor solution in tank 48. After 30 minutes in the drying tower 50 at 100° C., the tack-free composite is heated for 45 minutes in the curing tower 51 at 180° C. The composite is stripped from the belt and wound onto take-up reel 53 as the belt continues on its way to be treated once again in a continuous manner.

EXAMPLE IV

A solution of a polyamic acid precursor obtained from benzophenone tetracarboxylic dianhydride (BTDA) and metaphenylenediamine is prepared at a 20% solids concentration, using a solvent mixture of dimethylacetamide and xylene in the proportions of 9:1, by weight. The resin precursor solution is placed in the dip tanks 42, 48 of FIG. 6. In place of the endless belt 40, an aluminum foil 0.002″ thick is continuously fed from a pay-off reel, past a station where one side is sprayed with a release agent, then into the first dip tank, through the drying tower 43 at 100° C. and the curing tower 44 at 220° C., making a sufficient number of passes in each tower to provide a cured aromatic polyimide film on both sides of the aluminum foil. A plurality of individual strip conductors slit from copper foil 0.0027″ thick are fed from the pay-off reel 45 through the guide rolls 46 and into the resin solution tank 47 together with the precoated aluminum foil which first passes over the web guide 47. In the tank 48, the materials are all wetted on both sides, combined between the squeeze bars 49 and carried into and through the vertical drying tower 50 and curing tower 51, set at 100° C. and 200° C., respectively. Two additional passes are made through the resin solution tank and the towers in order to increase the film thickness of the cured insulating resin. The resultant composite will contain a 0.002 mil thick film of insulation on both top and bottom. The product at this point is a composite of the multi-conductor cable and the coated aluminum foil.

Since one side of the aluminum foil is treated with a release agent, the flat multi-conductor cable may be separated from the composite by a continuous stripping action and the multi-conductor cable may be separately wound on a take-up reel. The multi-conductor cable may be utilized in the normal way. The aluminum foil will have a resinous film on only one side and may be continuously passed through a bath containing hot concentrated hydrochloric acid to dissolve the aluminum and leave an integral self-supporting film of cured aromatic polyimide resin. The film is then washed with a water spray, dried by passing through an air circulating oven at 125° C. and wound on a take-up reel. The film will be clear amber, flexible, tough and above 0.002″ in average thickness. As an alternative to the acid removal technique, it is possible to separate or strip the film and foil mechanically by pulling them apart under tension. The mechanical stripping could be assisted by spraying a release coating on both sides of the foil.

EXAMPLE V

Example IV is repeated except that an aromatic polyamic acid precursor solution derived from the reaction of pyromellitic dianhydride and 3,4′-diaminobenzanilide is employed.

Figure 7:
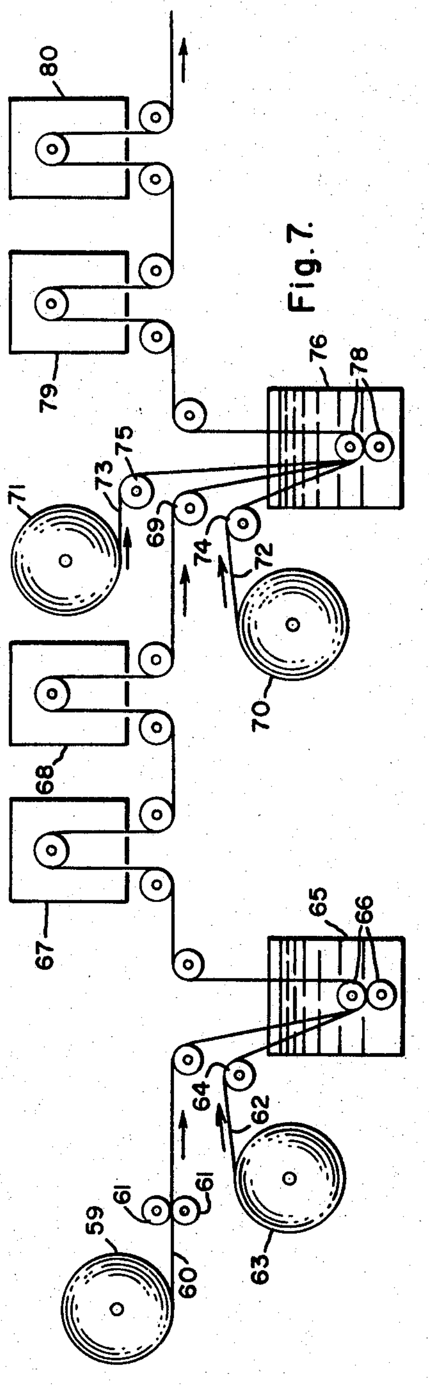
FIG. 7 is a schematic elevation illustrating yet another method of preparing the flat cable in accordance with this invention.

Shielded flat conductor cable may also be made by the method illustrated in FIG. 7. The metallic strip conductor 60 are paid-off of the reel 59, pass over the conductor guide rolls 61 and then pass into the resin tank 65. Simultaneously, the backing strip 62 is paid-off of reel 63, passes over the guide rolls 64 into the resin tank 65. The conductors 60 and the backing strip 62 are separately wetted by the precursor solution and are forced together or merged into a unitary composite by the squeeze-rolls 66. The conductors are held in place by the surface tension of the deposited wet film of the solution. The composite of backing strip, conductors and wet film moves through a heated vertical drying tower 67, making a sufficient number of passes to drive off the solvent and make the composite tack-free. The tack-free composite is then moved through a heated vertical curing tower 68, making a sufficient number of passes to cure the deposited wet film to its solid resinous state. The cured composite of conductors, backing and supporting film passes over position guide 69 into the precursor solution tank 76. Simultaneously, the metal mesh shields 72, 73 from the pay-off reels 70, 71 pass over the position guides 74, 75, respectively, into the precursor solution tank. Each of the metal shields and the cured composite are wetted by the precursor solution before they are forced together into a unitary structure at the squeeze-rolls 78. The metal mesh shields and the cured composite are held together by the surface tension of the deposited precursor solution. The uncured shielded composite moves through a heated vertical drying tower 79, making a sufficient number of passes to drive off the solvent and make the composite tack-free. From the drying tower, the tack-free shielded cable is moved through a heated vertical curing tower 80, making a sufficient number of passes to cure the deposited film of precursor to its solid flexible resinous state.

EXAMPLE VI

A dimethyl acetamide solution of a precursor formed by the reaction of pyromellitic dianhydride and 3,4′-diaminobenzanilide, containing 13 percent solids, is added to the resin solution tanks described hereinabove. Individual flat copper conductors 0.004 inch x 1/16 inch together with a polyester paper 0.005 inch thick are simultaneously passed through the first resin solution, dried for 30 minutes in the tower at 100° C. and cured for 45 minutes in a tower at 150° C. The cured composite together with two strips of 0.005 inch thick steel mesh shields is passed through the second tank containing the precursor solution. After 30 minutes in the drying tower at 100° C., the tack-free composite is heated for 45 minutes in the curing tower at 150° C.

EXAMPLE VII

Example VI may be repeated using a solution of a precursor polymer obtained from pyromellitic dianhydride and 4,4′-diaminophenyl ether in dimethyl acetamide.

In all of the methods described hereinabove, the conductors must be of appropriate size and configuration as they are positioned on the backing strip. Rolled flat wire or slit metal foil may be employed to provide the appropriate number of flat conductors on the backing. If burr problems are encountered with slit edges, the burrs may be etched away by a chemical or electrolytic bath or the foil may be cut slightly wider than the desired conductor width and the edges may be folded in with an appropriate rolling operation.

The size of the flat conductor may vary considerably with the particular service requirements for the ultimate cable. Generally, thicknesses up to about 0.005 inch thick will be satisfactory and adjustments in required resistivity may be made by variations in conductor width. The flat conductors may have a thickness as high as about 0.010 inch. Above that, a very thick resinous film will be required to support multiple conductors and the flexibility will be decreased. Resin film thicknesses may be as high as 0.010 inch on each side of the conductors. Above that thickness, flexibility will be impaired. Similarly, the backing strip may be as thick as 0.010 inch but thinner backing materials are preferred for flexibility.

Generally from .0001 to .0005 inch of insulating film is obtained in each pass through a resin solution tank, drying and curing ovens. Hence, thick films also tend to require an excessive number of passes.

While the above examples are directed to cables having a plurality of substantially planar parallel conductors, it is to be understood that other conductor configurations, as for example twisted pairs, may be made by the described methods and with the described supporting and insulating resinous films with the advantages attendant thereto.

The preparation of the aromatic polyamic acid precursors, suitable for use in this invention, is described in detail in U.S. application Serial No. 295,279, assigned to the assignee of this invention and British Patents 903,271 and 898,651. Aromatic polyamic acids suitable for use in this invention have the recurring unit:

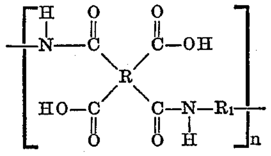

in which $n$ is at least 15, R is at least one tetravalent organic radical selected from the group consisting of:

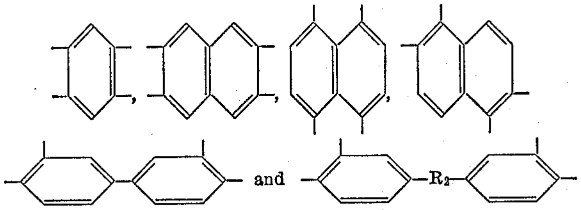

in which $R_2$ is a divalent aliphatic hydrocarbon radical having from 1 to 4 carbon atoms and oxygen, sulfur and sulfinyl radicals and $R_1$ is at least one divalent radical selected from the group consisting of:

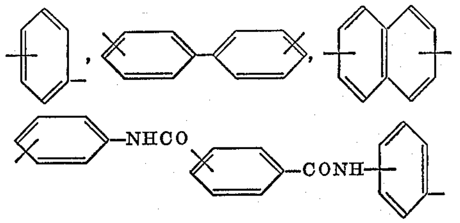

and

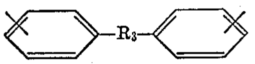

in which $R_3$ is a divalent organic radical selected from the group consisting of $R_2$, silicon and amido radicals. Suitable polyamic acid precursors may contain two or more of the R and/or $R_1$ radicals, especially multiple series of $R_1$ containing amido radicals.

Suitable solvents for the described polyamic acid precursors are, for example, the normally liquid organic solvents of the N,N-dialkylcarboxylamide class, preferably the lower molecular weight member of this class. Typical examples include dimethyl formamide, dimethyl acetamide, N-methyl pyrrolidone, dimethyl sulfoxide and pyridine. The solvents can be used alone, in combinations of solvents, or in combination with poor solvents such as benzene, benzonitrile, dioxane, butyrolactone, xylene, toluene and cyclohexane. The addition of water cannot be tolerated. The solvents are easily removed in the drying tower so that the condensation reaction which takes place in converting the precursors to the solid resin, may be immediately initiated in the curing tower. The precursor solutions are all highly viscous and rather low solids concentrations (below 30%) are required. Tower temperature, running speeds and film thickness are all functions of the viscosity-solids relationship of the polymer selected.

The methods described hereinabove are all directed to the in situ formation of the insulating and supporting aromatic polyimide or aromatic polyamide-imide resinous film. The in situ methods are preferred because of the attendant advantages outlined heretofore. A cable may, however, be prepared by bringing together pre-formed insulating and supporting films, at least one film being an aromatic polyimide or polyamide-imide, sandwiching the conductors between the films and bonding the structure together with an adhesive. This embodiment is illustrated in FIG. 4. The adhesives will ordinarily require a separate stripping operation to expose the surface of the conductors. Other improved methods for producingflat tape cable continuously are described and claimed in application Ser. No. 352,154, filed Mar. 16, 1964, assigned to the assignee of this invention. As noted heretofore, the aromatic polyimide and polyamide-imide resinous films may be conveniently and easily removed without damaging the fragile conductors by exposing the insulation to be removed to a hot caustic solution. Even though the films have a very high chemical and solvent resistance, strong alkali will remove the cured film in a relatively short time. By the use of appropriate masks, the insulation may be removed from specific areas to expose the surfaces of specific conductors without affecting other portions of the film. The resinous films derived from the polyamic acid precursor formed by the reaction of pyromellitic dianhydride and 3,4'-diaminobenzanilide exhibit a caustic solubility far in excess of the other polyamide-imide insulating films and are, accordingly, preferred. Specific details on insulation removal, exposure of conductor surfaces and terminations thereto are described and claimed in application Serial No. 352,155 assigned to the assignee of this invention.

While there have been shown and described what are at present considered to be the preferred embodiments of this invention, modifications thereto will readily occur to those skilled in the art. It is not desired, therefore, that the invention be limited to the specific arrangements, embodiments and methods shown and described and it is intended to cover in the appended claims all such modifications as fall within the true spirit and scope of the invention.

We claim:

1. A flat flexible conductive cable having a plurality of individual conductive paths comprising, in combination, a flexible fibrous backing sheet impregnated and coated with a solid flexible resinous material, a plurality of relatively spaced discrete thin flat metallic strips disposed on and supported by the backing sheet, a film of a solid infusible flexible aromatic polyimide resin, covering and contacting a surface of said metallic strips, the film, the backing sheet and the metallic strips being bonded into a unitary flexible sandwich structure.

2. The cable of claim 1 in which the infusible film is a film of a polyamide-imide resin.

3. The cable of claim 1 in which the infusible film is a film of a polyamide-imide resin derived from the reaction of pyromellitic dianhydride and a diaminobenzanilide.

4. A flat flexible conductive cable having a plurality of individual conductive paths comprising, in combination, a flexible fibrous sheet impregnated and coated with a first solid flexible resinous material, a plurality of spaced parallel thin flat copper strips disposed on and supported by the sheet, a film of a second infusible solid flexible resinous material contacting and insulating said metallic strips, the first and second resinous materials bonding the backing material and the copper strips into a unitary flexible structure, at least said second resinous material being an infusible aromatic polyimide resin.

5. The cable of claim 4 in which the second resinous material is an infusible aromatic polyamide-imide resin.

6. The cable of claim 4 in which the second resinous material is derived from the reaction of pyromellitic dianhydride and a diaminobenzanilide.

(References on following page)

References Cited

UNITED STATES PATENTS

| | | | |
|---|---|---|---|
| 3,004,229 | 10/1961 | Stearns | 174—117 X |
| 3,168,617 | 2/1965 | Richter | 174—117 |
| 3,179,634 | 4/1965 | Edwards | 260—78 |
| 3,179,635 | 4/1965 | Frost et al. | 260—78 |
| 3,215,574 | 11/1965 | Korb | 174—117 |
| 2,831,049 | 4/1958 | Cabral | 174—117 |
| 2,964,587 | 12/1960 | Minot | 174—117 |
| 2,200,776 | 5/1940 | Hoover | 156—55 |
| 2,453,313 | 11/1948 | Gordon | 156—55 |

FOREIGN PATENTS

| | | |
|---|---|---|
| 215,968 | 7/1958 | Australia. |

DARRELL L. CLAY, *Primary Examiner.*

LARAMIE E. ASKINS, JOHN F. BURNS, *Examiners.*

L. H. MYERS, E. GOLDBERG, D. A. KETTLESTINGS, H. HUBERFELD, *Assistant Examiners.*